May 30, 1950     I. B. McKEOWN     2,509,443
HIMALAYA AND SLUB MEANS FOR SPINNING FRAMES
Filed March 28, 1949     8 Sheets-Sheet 1

Fig-1

INVENTOR:
IRMA B. McKEOWN.
BY
ATTORNEY

Fig-3

May 30, 1950  I. B. McKEOWN  2,509,443
HIMALAYA AND SLUB MEANS FOR SPINNING FRAMES
Filed March 28, 1949  8 Sheets-Sheet 5

IRMA B. McKEOWN,
INVENTOR.

BY

ATTORNEY

Fig-11

May 30, 1950     I. B. McKEOWN     2,509,443
HIMALAYA AND SLUB MEANS FOR SPINNING FRAMES
Filed March 28, 1949     8 Sheets-Sheet 8

IRMA B. McKEOWN,
INVENTOR.

BY

ATTORNEY

Patented May 30, 1950

2,509,443

UNITED STATES PATENT OFFICE 2,509,443

HIMALAYA AND SLUB MEANS FOR SPINNING FRAMES

Irma B. McKeown, Charlotte, N. C.

Application March 28, 1949, Serial No. 83,952

16 Claims. (Cl. 57—38)

1

This invention relates to textile spinning frames and more especially to an improved attachment for spinning frames and the like to make Himalaya yarn, slub yarn, or flake fillings and to further provide pattern means in conjunction with the attachment to provide the filling or yarn, when in finished form, with abnormally extended enlarged portions, at variously spaced intervals according to a desired pattern, for the purpose of producing an ornamental design in fabrics when woven thereinto.

In the present invention, as in my Patent Number 2,046,919 of July 7, 1936, the desired effect is produced by introducing an extra stock of yarn immediately beyond the front rolls in the spinning frame by temporarily and intermittently accelerating the center and back rolls to cause them to rotate at approximately the same number of revolutions per minute as the front rolls. After this extra stock has been introduced, the back and center rolls resume their normal revolutions per minute, which is approximately one-twelfth of that of the front rolls, thus resulting in an enlarged section being produced in the roving during acceleration of the center and back rolls, since the draft at this point will have been practically eliminated.

It is an object of this invention to provide a Himalaya attachment working in conjunction with a slub attachment and to provide pattern means for effecting operation of the Himalaya attachment at various intervals according to the desired pattern and to provide means for effecting operation of the slub attachment during the intervals at which the Himalaya attachment is not in operation to thus produce a flake filling having thick places in the yarn of varied length, the length of the thick places being unlimited, according to a desired pattern, during operation of the Himalaya attachment and the thick places occurring only periodically and being relatively short during the operation of the slub attachment. This is caused by reducing or stopping the drawing operation at predetermined intervals so as to produce intermittently spaced enlarged portions of various lengths in the strand of yarn.

It is another object of this invention to provide a driven shaft on which the front roll is mounted and to provide a gear train driven by the driven shaft for transmitting rotation to the intermediate and back rolls and to provide clutch means for intermittently imparting rotation to the back and intermediate rolls at a different rate of speed than their normal rate of speed and to provide

2 pattern means for automatically causing the clutch means to remain in engagement for a predetermined length of time to thus produce unusually long thick places in the yarn as it passes between the intermediate and the front rolls.

Some of the objects of the invention having been stated, other objects will appear as the description proceeds, when taken in connection with the accompanying drawings, in which.

Referring more specifically to the drawings, the numeral 10 indicates one of the end supports of a spinning frame which has rotatably mounted therein a driven cylinder shaft 11 (Figure 1) having a pinion 12 fixedly secured thereon which transmits rotation to a right-hand intermediate gear 15 through the medium of an idler gear 16 having a pinion 17 integral therewith and which is rotatably mounted on a stub shaft 20 fixedly mounted in the end support 10.

The right-hand intermediate gear 15 is fixedly mounted on a conventional shaft 21 and meshes with a conventional left-hand intermediate gear 22 fixedly mounted on a conventional shaft 23, the shafts 21 and 23 being rotatably mounted in the end support 10. A pinion 25 is also fixedly mounted on the shaft 23 and transmits rotation to a pinion 26 which meshes with a pinion 27 and the pinion 27 also meshes with a pinion 30. The pinions 26, 27 and 30 are rotatably mounted on stub shafts 26'a, 27'a and 30'a respectively, which are fixedly mounted in the end support 10. The pinion 30 has a beveled gear portion 31 integral therewith which meshes with a beveled gear 32 fixedly mounted on the upper end of a shaft 33 rotatably mounted in a bracket 34 secured to the end support 10 as by screws 35.

The lower end of the shaft 33 has a worm 36 fixedly mounted thereon which meshes with a worm gear 37 fixedly mounted on a shaft 38 which is rotatably mounted in the end support 10 and drives the conventional builder motion which is a usual part of spinning frames of this type. The shaft 38 drives the Himalaya pattern attachment to be later described. The parts heretofore described are the usual parts of a spinning frame and it is with these parts that the present invention is adapted to be associated.

The gears 22 and 15 mesh with other gears 40 and 40', respectively (Figure 1), which are fixedly mounted on shafts 41 and 41', respectively, for driving the front bottom rolls at each side of the spinning frame. The parts associated with the gear 40' are identical to the parts associated with the gear 40 and will therefore bear the same reference characters with the prime notation added.

Referring to Figures 1, 2, 3 and 4, it may be observed that there is a clutch pinion 42 fixedly mounted on the shaft 41 immediately adjacent the gear 40. The clutch pinion 42 has an annular portion 42a defining a circular cavity 43 (Figures 4 and 5) in which a ratchet wheel 44 is loosely mounted. The ratchet wheel 44 is keyed, as at 45, on a tubular shaft or sleeve 46 rotatably mounted on the bottom roll shaft 41.

The annular portion 42a of the clutch pinion 42 also has a radially extending groove 47 therein (Figure 5) which extends from the circular cavity 43 to the peripheral edge of the annular portion 42a and in which a dog 50 is mounted for radial sliding movement.

Figures 4, 5, 6:
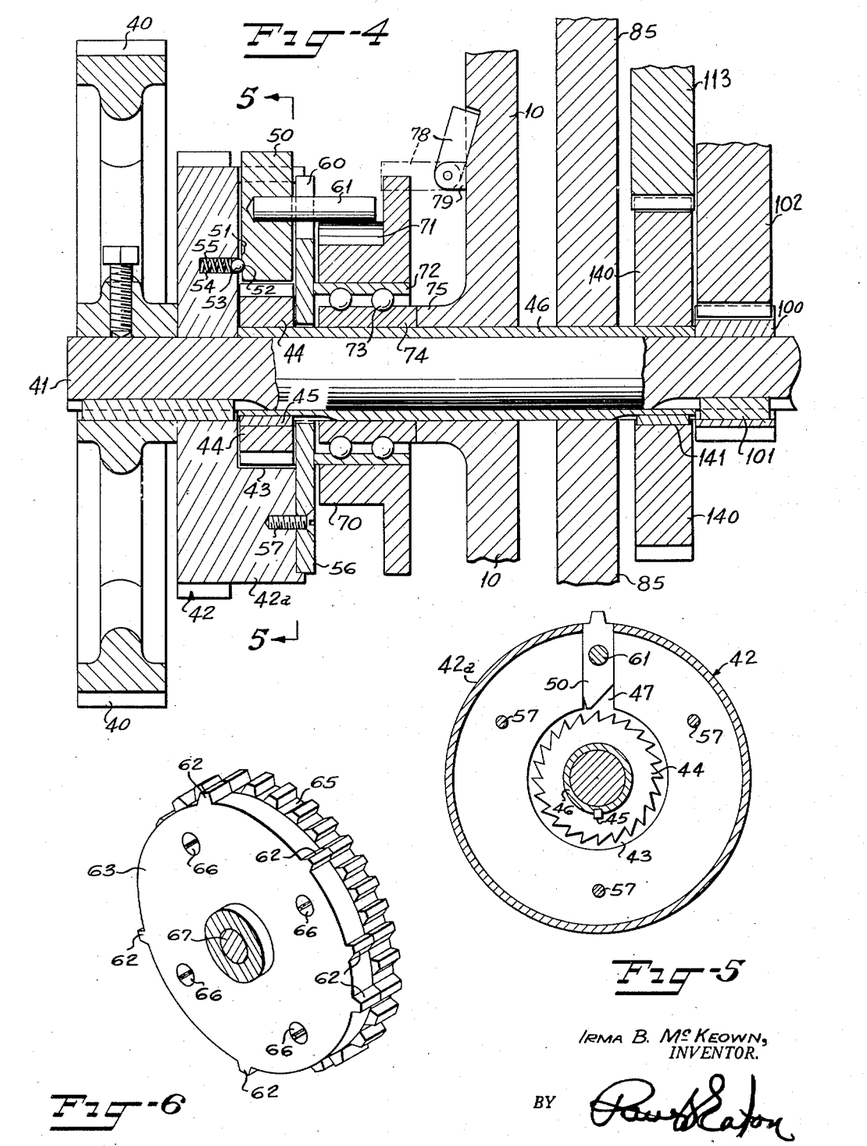
Figure 4 is an enlarged vertical sectional view taken substantially along the line 4—4 in Figure 1.
Figure 5 is a vertical sectional view on a slightly reduced scale and is taken substantially along the line 5—5 in Figure 4 and showing the clutch and dog arrangement for changing the speed of the rear and intermediate rolls.
Figure 6 is an isometric view with parts broken away and showing the "hunting tooth" or pattern gear which is used in conjunction with the slub attachment and is taken substantially along the line 6—6 in Figure 2.

Referring to Figure 4, it may be observed that the dog 50 has a pair of closely spaced cavities 51 and 52 therein which are adapted to be intermittently engaged, as will be later described, by a ball 53 urged against the dog 50 by a compression spring 54. The pinion 42 has a bore 55 extending partially therethrough for slidable reception of the ball 53 and the spring 54.

The ratchet wheel 44 and the dog 50 are retained in their respective cavities 43 and 47 by a circular plate 56 secured on the annular portion 42a of the pinion 42 by any suitable means such as screws 57. This plate 56 has a radially disposed slot 60 therein which is loosely penetrated by a pin 61 projecting from and fixedly mounted in the dog 50.

Figure 1:
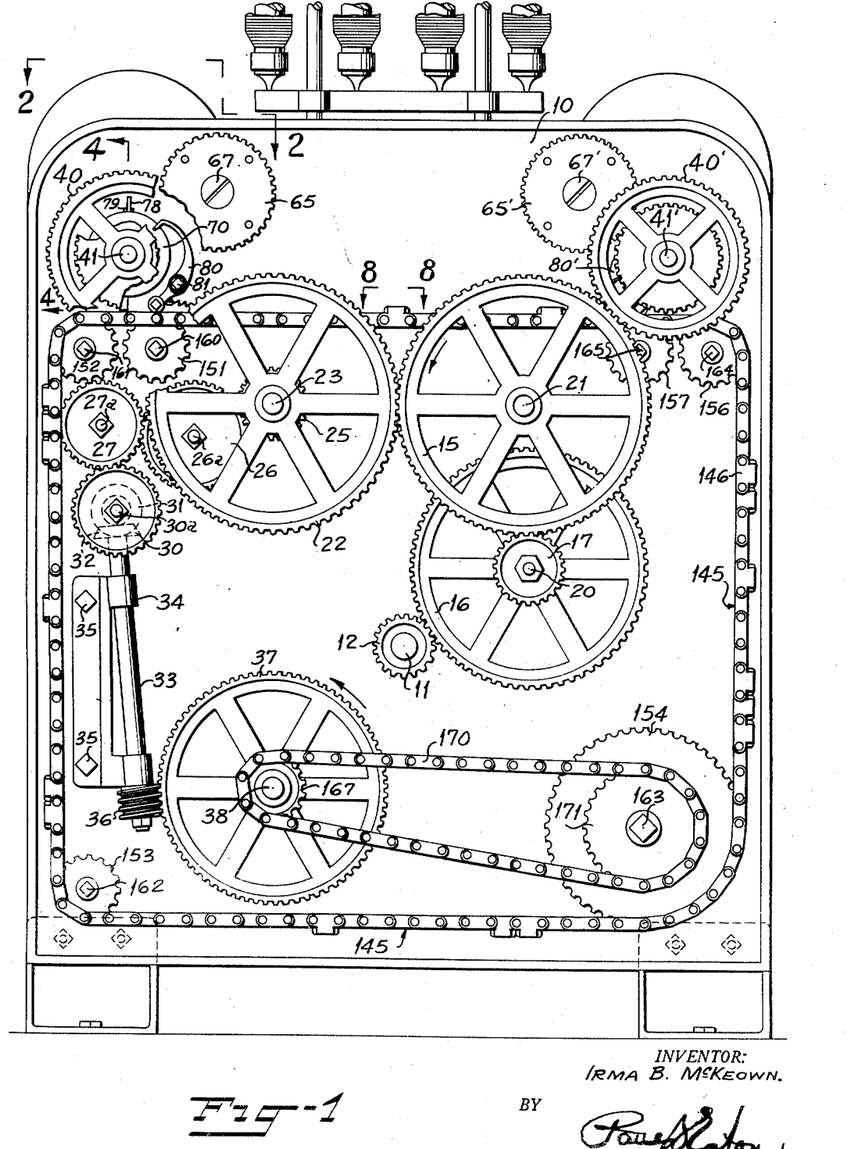
Figure 1 is an end view of a spinning frame with parts broken away and omitting a portion of the creel and showing the invention applied thereto.
Figure 2:
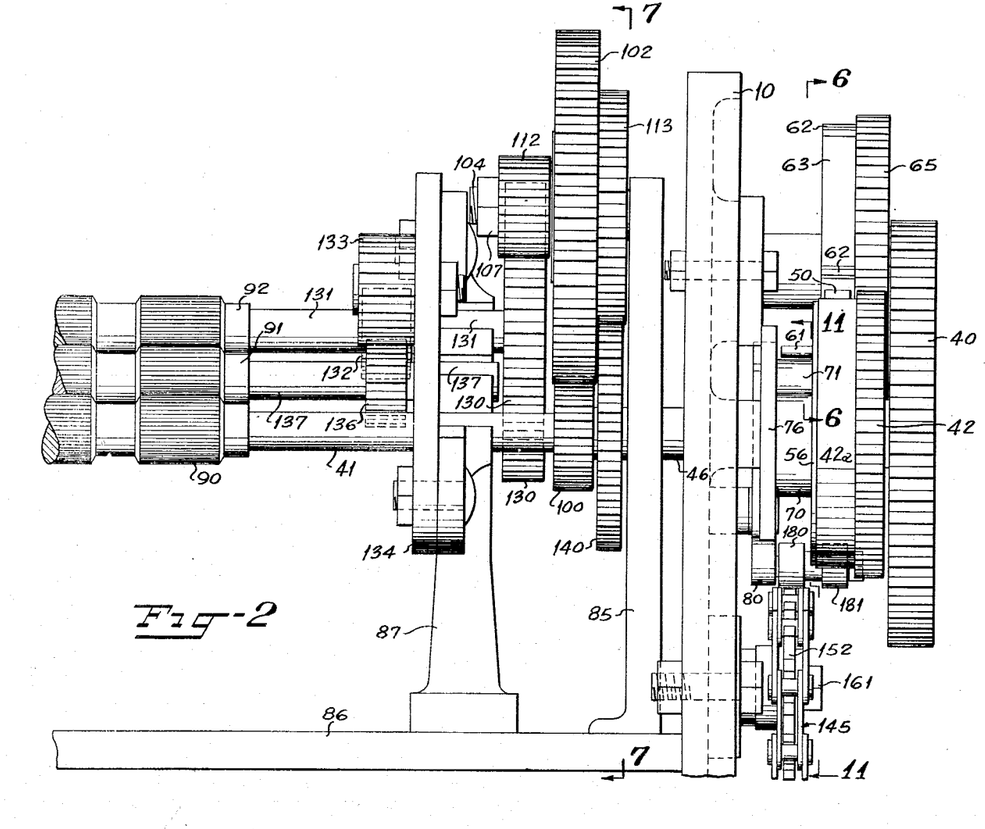
Figure 2 is an elevation showing the arrangement of the gear train for driving the bottom rolls of the spinning frame and is taken looking from the left-hand side of Figure 1 to the right, but omitting the top rolls for purposes of clarity.

During normal operation, that is, during the time the front, rear and intermediate bottom rolls are being driven at the usual speed for producing the desired draft in the yarn without the yarn being slubbed or flaked, the dog 50 assumes a position out of engagement with the teeth in the ratchet wheel 44, or the position shown in Figures 4 and 5. However, during the forming of thick places in the yarn between the intermediate and front rolls, at predetermined intervals or, in other words, during the slubbing operation, the dog 50 is forced inwardly and into engagement with the ratchet wheel 44 momentarily by any one of a plurality of spaced gear teeth 62 on a pattern gear 63 which is commonly known as a "hunting tooth" gear. It will be noted in Figure 6 that the teeth 62 on the pattern gear 63 are spaced various distances apart from each other around the periphery of the gear 63 according to a desired slubbing pattern. The pattern gear 63 is secured to a conventional idler pinion 65, by any suitable means such as screws 66. The pinion 65 is rotatably mounted on a stud 67 (Figures 1 and 6) threadably mounted in the end support 10. The pinion 65 meshes with and is driven by the clutch pinion 42 for imparting continuous rotation to the same while the spinning frame is in operation (Figure 2).

Figure 11:
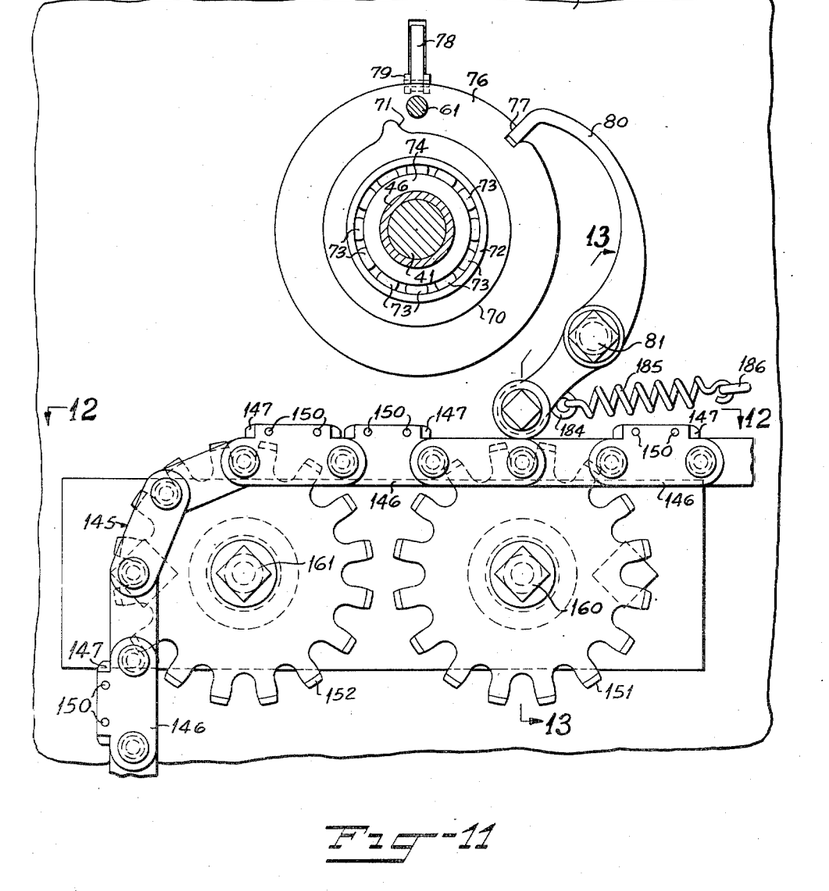
Figure 11 is an enlarged vertical sectional view showing how the Himalaya attachment is brought into engagement with the slub attachment and is taken substantially along the line 11—11 in Figure 2.

Now, when the dog 50 is projected into engagement with the ratchet wheel 44 by a tooth 62 on the pattern 63, the pin 61 on said dog 50 is moved into engagement with the periphery of a cam wheel 70 (Figures 1 and 11) having a lobe 71 integral therewith (Figures 4 and 11). This cam wheel may be rotatable on the tubular shaft 46 in any desired manner, however, it is shown in the drawings as being pressed onto an outer race 72 of a ball bearing assembly and being rotatable on balls 73 which rotate on an inner race 74 (Figure 4) pressed onto the tubular shaft 46. The inner race slidably engages a boss portion 75 integral with the end support 10 of the spinning frame. The tubular shaft 46 is rotatably mounted in and slidably penetrates the end support member 10.

The cam 70 has an enlarged circular portion 76 having a notch 77 in its periphery, the portion 76 being of substantially larger radius than the radius of the outer edge of the lobe 71, as is clearly shown in Figure 11. During the time the slubbing or flaking operation is to be controlled by the pattern gear 63 (Figures 1, 2, 3 and 6), the cam wheel 70 must remain in a fixed position, which is brought about by the notch 77 being engaged by a finger or dog 80 oscillatably mounted as at 81 (Figures 3 and 11) on the end support 10. This dog or finger 80 is a part of the Himalaya attachment to be later described.

If it so happens that the operator does not desire to use the Himalaya attachment in combination with the pattern gear 63 (Figure 6), the cam 70 may be secured against rotation by providing a pivoted latch (Figure 4) 78 pivoted on a projection 79 on the end support 10 which can be thrown into notch 77. On the other hand, if the operator desires to use the Himalaya pattern means, to be later described, independently of the pattern gear 63, then the stud 67 may be removed from the end support 10 along with the pinion 65 and the pattern gear 63, there being a roller on the finger 80, to be later described, which will serve the same purpose as the pattern gear 63, namely, the moving of the dog 50 into engagement with the ratchet wheel 44.

After the dog 50 has been moved into engagement with the ratchet wheel 44 in the manner heretofore described, to thus transmit rotation to the tubular shaft 46, the ratchet wheel 44 may be caused to rotate a complete revolution or any fractional part thereof according to the point at which any one of the teeth 62 of the pattern gear 63 may have engaged the outer end of the dog 50 with respect to the lobe 71 on the cam 70, inasmuch as the lobe 71 will project the pin 61 outwardly along with the dog 50 when the pin 61 engages the same, provided the cam wheel 70 is in a locked position as has heretofore been described.

Figure 3:
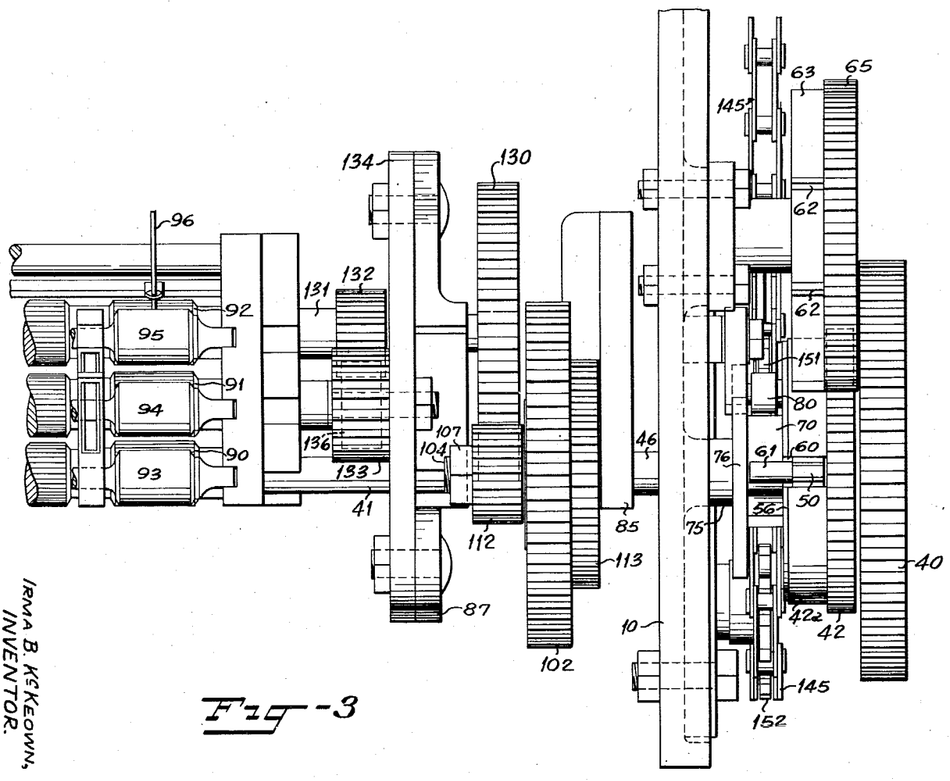
Figure 3 is an enlarged top plan view showing a portion of one side of the spinning frame.

Referring to Figures 2, 3 and 4 it may be observed that the tubular shaft 46 is also rotatably mounted in a bearing stand 85 which is supported by the conventional roll stand support rail 86 of the spinning frame and this tubular shaft 46 terminates at a point closely adjacent the bearing stand 85. However, the shaft 41 extends a substantial distance beyond the tubular shaft 46 and is rotatably mounted in a conventional roll stand 87 supported by the roll stand support rail 86 (Figures 2 and 3). The shaft 41 then extends to the left in Figure 3 and is connected, in a conventional manner, to the bottom front roll 90 which extends lengthwise of the machine.

Referring to Figures 2 and 3 there may be observed the intermediate and rear or back bottom rolls 91 and 92, respectively, which are also rotatably mounted at spaced intervals in roll stands 87 one of which is shown. The front, intermediate and rear or back bottom rolls 90, 91 and 92, have resting on the upper sides thereof top rolls 93, 94 and 95, respectively. A roving 96 is fed between the rear rolls 92 and 95, then between the intermediate rolls 91 and 94 and then between the front rolls 90 and 93 for the drawing out operation.

Now, referring to Figures 4 and 5, and assuming that the dog 50 is in its outermost position, that is, out of engagement with the ratchet wheel 44, a normal rate of speed will be transmitted to the front, intermediate and rear bottom rolls 90, 91 and 92, respectively. Normal rotation is transmitted to the front bottom roll 90 at all times inasmuch as the shaft 41 is connected directly to the bottom roll 90. Rotation at a normal rate of speed is transmitted to the intermediate and rear bottom rolls through a pinion 100 keyed as at 101 (Figure 4) to the shaft 41 and slidably engaging the right-hand end of the tubular shaft 46 in Figure 4.

Figure 7:
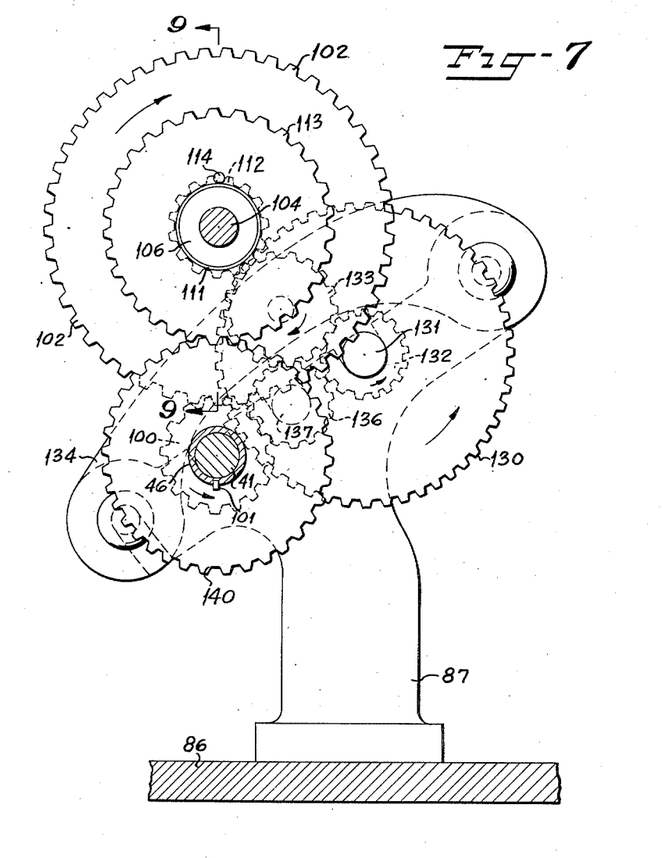
Figure 7 is a vertical sectional view taken along the line 7—7 in Figure 2 and showing a part of the gear train for driving the rear and intermediate rolls and also showing a roll stand and a portion of the rail on which it is mounted.
Figures 9, 10:
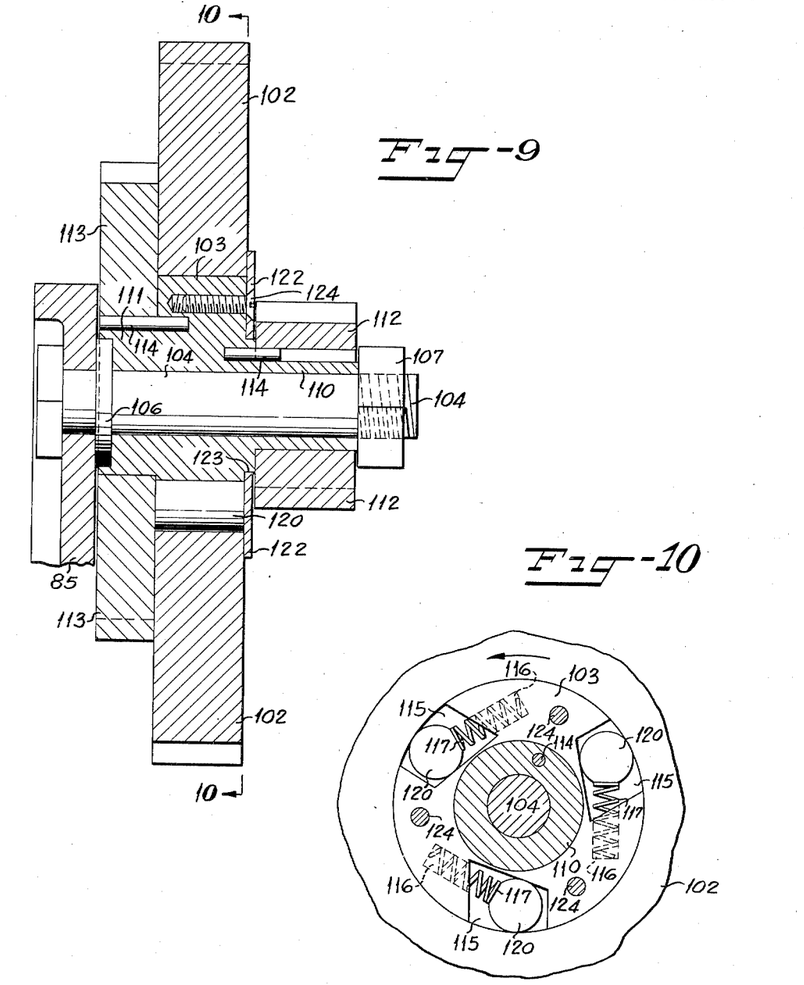
Figure 9 is an enlarged vertical sectional view taken along the line 9—9 in Figure 7 and showing a part of the clutch means instrumental in effecting the change in speed of the rear and intermediate rolls.
Figure 10 is a vertical sectional view taken substantially along the line 10—10 in Figure 9, but showing only the central portion thereof.

This pinion 100 meshes with an idler gear 102 disposed thereabove in Figures 2, 4 and 7 which is rotatably mounted on a hub 103 (Figures 9 and 10). The hub 103 is rotatably mounted on a stub shaft 104 projecting from the bearing stand 85 and having an enlarged annular portion 106 and a nut 107 threadably mounted thereon between which the hub 103 is mounted to prevent the endwise movement thereof. The hub 103 has restricted portions 110 and 111 at opposite sides thereof on which pinions 112 and 113, respectively, are fixedly mounted as by dowel pins 114. The hub 103 has a plurality of slots 115 cut longitudinally thereof and whose surfaces nearest the shaft 104 are disposed at an acute angle with respect to a line drawn from the center of the hub 103 and bisecting each of the slots 115. Each slot 115 has an adjacent cavity or bore 116 which is adapted to accommodate a compression spring 117. This compression spring 117 normally urges a roller 120, which is inserted in the slot 115, against the interior surface of the gear 102 and also against the surface nearest the shaft 104 at the narrow end of the slot 115.

The pinion 100 transmits rotation to the gear 102 to cause the gear 102 to rotate in a clockwise direction in Figure 7 and in a counterclockwise direction in Figure 10, and it will be noted in Figure 10 that the slots 115 as heretofore stated, are not cut normal to the radius of the hub 103, but instead they are cut at an acute angle thereto; therefore, when the gear 103 is caused to rotate in a counterclockwise direction in Figure 10, the rollers 120 will be forced towards the small end of the slots 115, thus resulting in the rollers being caused to bind against the interior of the gear 102 and the inner surfaces of the slots 115 which will result in the gear 102 transmitting rotation to the hub 103 as well as the associated pinions 112 and 113.

In order to retain the rollers 120 in the slots 115, there is provided an annular plate 122 which is snugly mounted on an intermediate shoulder portion 123 of the hub 103 and is secured to the hub 103, by any suitable means such as screws 124. It will be noted in Figure 9 that this annular plate 122 also extends a substantial distance beyond the outer edge or periphery of the hub 103 to thus slidably confine the gear 102 against the gear 113. It is to be understood that the gear 102 may rotate freely with respect to the annular plate 122 and the pinion 113. The above is what is known as an over-riding clutch.

Having thus transmitted rotation to the pinion 112, the pinion 112 meshes with a gear 130 (Figure 7) which is fixedly mounted on an end portion 131 of the rear bottom roll 92. The end portion 131 also has a small pinion 132 fixedly mounted thereon which meshes with an intermediate idler gear 133 rotatably mounted on a swing arm 134. This intermediate gear also meshes with a pinion 136 fixedly mounted on end 137 of the lower intermediate roll 91 for driving the same. The gear 132 usually is of slightly larger diameter than the gear 136 and has one or more teeth thereon than gear 136, to provide a slight draft to the sliver between the back and intermediate rolls. It is thus seen how normal rotation is transmitted to the rear and intermediate bottom rolls 92 and 91, respectively, for the normal drawing out operation.

When it is desired to produce flake filling or thick places in the strand 96, the dog 50 is projected inwardly to engage the ratchet wheel 44 in Figure 5 and in so doing the ball 52 (Figure 4) will bear against the dog 50 in engagement with the slot 51 and the pin 61 will revolve around the periphery of the cam wheel 70 in close proximity thereto. The ratchet wheel 44 will then transmit rotation to the tubular shaft 46. Now, the tubular shaft has a gear 140 fixedly mounted thereon as by a key 141 (Figure 1). This gear 140 meshes with the gear 113, heretofore described as being fixedly mounted on the restricted portion 111 of the hub 103, and, due to the difference in the relative diameters of the gears 100 and 102 and the gears 140 and 113, the hub 103 will be caused to rotate at a much faster rate of speed than it will during normal operation.

Due to the fact that the hub 103 now rotates at a faster rate of speed than the rate at which the gear 102 is caused to rotate by the pinion 100, the frictional contact between the rollers 120 and the surfaces of the notches 115 nearest the shaft 104 in the hub 103 (Figure 10) and the inner surface of the gear 102 will be overcome, inasmuch as the gear 102 will urge the rollers 120 toward the compression spring 113. As a result of this hub 103 being rotated at a greater speed, it is obvious that the pinion 112 would rotate at a greater rate of speed than the gear 102, thus causing the rear and intermediate bottom rolls 92 and 91, respectively, along with the upper rolls 95 and 94, respectively, to rotate at a faster rate of speed, which would be equal to or greater than the rate of speed of the front bottom roll 90 and the upper roll 93.

It is manifest that as long as the intermediate and rear bottom rolls 91 and 92, respectively, are caused to rotate at approximately the same rate of speed as the front bottom roll 90, the draft of the yarn strand 96 as it passes over the rolls 90 to 92, inclusive, will not take place, thus resulting in a thickened place in the yarn until the pin 61 in Figure 4 engages the lobe 71 of the cam wheel 70 (Figure 11) to thus project the dog 50 outwardly and out of engagement with the ratchet wheel 44, at which time the rolls 91 and 92 will resume their normal rate of speed in the manner heretofore described.

Himalaya attachment

It has already been stated how the operation of the cam 70 is effected by holding the cam 70 in locked position so as to project the pin 61 (Figure 4) outwardly upon the pinion 42 completing a revolution or a fractional part thereof after the dog 50 has been moved inwardly by any one of the teeth 62 on the pattern gear 63. By referring to Figure 1, it may be observed that to increase the diameter of the pinion 65 or the pattern gear 63 substantially beyond that shown in the drawings would not be possible and it also would not be practicable as a result of which the length of the thickened portions in the strand 96 would be limited to the equivalent of one revolution of the pinion 42 in Figure 4 and variations in the relative length of the thickened portions in the yarn would be limited to the range of patterning possible by the gear teeth 62 on the pattern gear 63.

Figure 8:
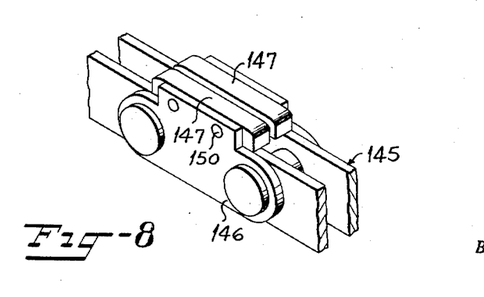
Figure 8 is an enlarged isometric view showing a portion of the pattern chain used in conjunction with the Himalaya attachment and is taken substantially along the line 8—8 in Figure 1.

Consequently, in order to produce greater lengths of the thickened portions in the strand of yard 96 than has heretofore been possible, I have provided a pattern chain which is shown in the drawings as being a single width link sprocket chain. This pattern chain is indicated at 145 in Figures, 1, 2, 8, 11, 12 and 13 and is provided with a plurality of special pattern links 146 having flat cam members 147 secured thereto as by pins 150 (Figures 8 and 11). By referring to Figures 1, 11 and 12 it may be observed that the special links 146 are spaced various distances apart from each other along the continuous link pattern chain 145 in accordance with a desired pattern. In some instances, the pattern links 146 are provided immediately adjacent one another as shown in the central portion of Figure 11.

The pattern chain 145 (Figure 1) passes over idler sprocket wheels 151 and 152 and downwardly to another idler sprocket wheel 153 and then across the lower portion of the end support member 10 and then engages a large driven sprocket wheel 154. The pattern chain 145 then extends upwardly at the right-hand side of the end support 10 and engages an idler sprocket wheel 156 after which the pattern chain 145 extends laterally in engagement with a sprocket wheel 157 and across the end support 10 to the idler sprocket wheel 151. The sprocket wheels 151, 152, 153, 154, 156 and 157 are rotatably mounted on stub shafts 160 to 165, inclusive, respectively, which are threadably mounted in the end support 10.

The worm gear 37, heretofore described, drives the shaft 38 and this shaft 38 has a sprocket wheel 167 fixedly mounted thereon on which the left-hand portion of a sprocket chain 170 is mounted. The right-hand portion of the sprocket chain 170 is mounted on a larger sprocket wheel 171 which is integral with the sprocket wheel 154 heretofore described, and it is thus seen that rotation is imparted to the sprocket wheel 154 from the worm gear 37 to cause the pattern chain 145 to move in a counterclockwise direction in Figure 1. The purpose of the idler sprocket wheels 151 and 152 and 156 and 157 being mounted closely adjacent each other is to prevent the pattern chain 145 from sagging as it passes beneath the adjacent oscillatable fingers 80 associated with the slub attachment.

Figure 12:
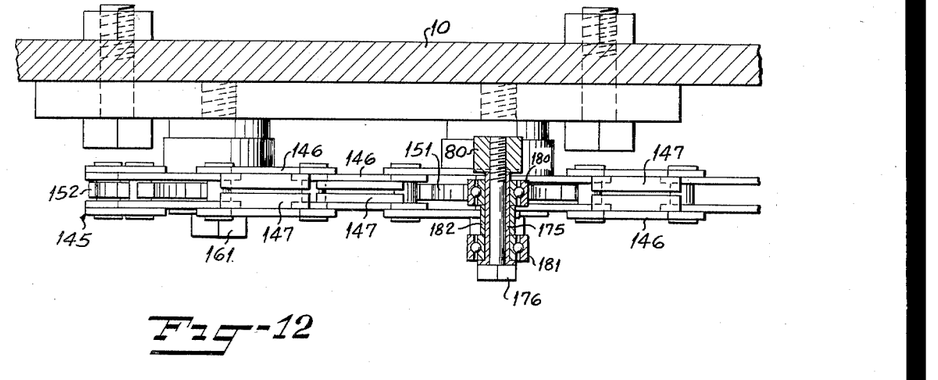
Figure 12 is a sectional plan view taken along the line 12—12 in Figure 11.
Figure 13:
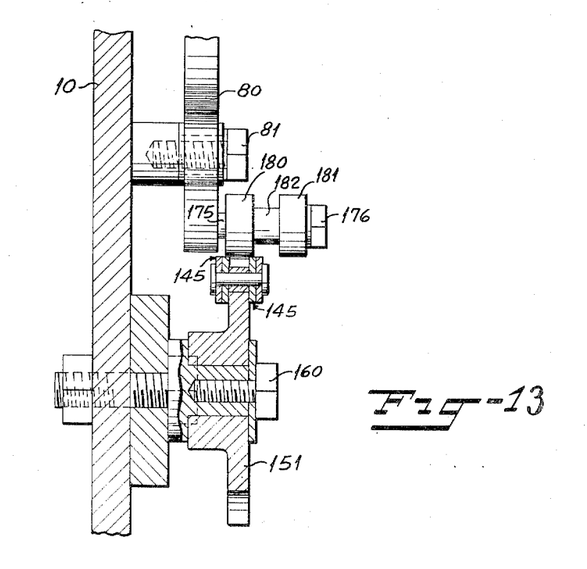
Figure 13 is a vertical sectional view taken substantially along the line 13—13 in Figure 11.

Referring to Figures 11 and 13, it may be observed that the finger 80 has a sleeve 175 secured thereto as by a bolt 176 (Figure 12) and which has the inner races of spaced ball bearing cam followers 180 and 181 fixedly mounted thereon as by a pressed fit. These ball bearing cam followers are spaced apart from each other as by a spacer sleeve 182 (Figure 12). The lower portion of the finger 80 in Figure 11 has a spring perch 184 integral therewith to which one end of a tension spring 185 is connected, the other end of the tension spring 185 being connected to a spring perch 186 projecting from the end support 10. The tension spring 185 normally urges the upper free end of the finger 80 into engagement with the enlarged annular portion 76 of the cam wheel 70 and in so doing, urges the cam follower 180 into engagement with the upper surface of the pattern chain 145 as it passes over the sprocket wheel 151.

By referring to Figure 2, it may be observed that the cam follower 181 is disposed in the same vertical plane as the annular portion 42a of the clutch pinion 42 and when the cam portion 147 on any one of the pattern links 146 moves into engagement with the cam follower 180, the finger 80 is moved in a clockwise direction in Figure 11 to thus move the upper free end of the finger 80 out of engagement with the notch 77 in the enlarged portion 76 of the cam wheel 70. Immediately after the free end of the finger 80 has moved clear of the notch 77 in the cam wheel 70, the cam follower 181 engages the periphery of the annular portion 42a of the clutch gear 42.

Now, due to the fact that the clutch pinion 42 rotates at all times while the spinning frame is in operation, the dog 50 (Figure 5) will then move into engagement with the cam follower 181 and will thus be moved inwardly to engage the ratchet wheel 44 to thus impart rotation to the tubular shaft 46 and its associated gear 140 (Figure 4) to cause the rear and intermediate rolls 92 and 91, respectively (Figure 2), to rotate at a greater speed than normal in the manner heretofore described, until the special pattern links 146 have moved out of engagement with the cam follower 180. This will, of course, permit the tension spring 185 to pull the finger 80 in a counterclockwise direction in Figure 11 to where the upper free end of the finger 80 will engage the periphery of the enlarged portion 76 of the cam wheel 70 and will ultimately fall into the notch 77 in the enlarged portion 76 as shown in Figure 11. This will cause the slub attachment to continue its operation independently of the Himalaya attachment at which time only the patterning in the pattern gear 63 (Figure 6) will be effective.

By referring to Figure 1 it may be observed that there would obviously be a considerable difference in ratio between the gear 22 and the gear 40 as compared with the ratio between the gear 22 and the driven sprocket wheel 154. It is evident that this would cause the pattern chain 145 to move very slowly in a counterclockwise direction in Figure 1 relative to the normal speed of the gear 40.

It is thus seen that I have provided an improved attachment for spinning frames which will not only make ordinary two-count Himalaya yarn but will also make a full line of flake or slub yarns that is extremely simple in operation, may be produced at relative low cost and is flexible as to adjustment and patterning for producing specialty yarns of the type described in a very wide range of patterns which could not be reproduced on similar devices now available.

In the drawings and specification there has been set forth a preferred embodiment of the invention, and although specific terms are employed, they are used in a generic and descriptive sense only, and not for purposes of limitation, the scope of the invention being defined in the claims.

I claim:

1. In a spinning frame having rear, intermediate and front rolls for drawing fibers, means for driving the rear and intermediate rolls and for intermittently increasing the speed of rotation of the rear and intermediate rolls comprising a drive shaft, a first gear fixed on the said drive shaft, a shaft extending from the front rolls, a second gear fixed on the end of the front roll shaft and meshing with the first gear, a first pinion fixed on the roll shaft, a stud shaft having a hub member rotatable thereon, a second pinion and a third gear fixed on the hub member, a fourth gear mounted on the hub member and meshing with the first pinion, an overriding clutch between the fourth gear and the hub member, a direct driving connection between the second pinion on the hub member and the rear and intermediate rolls for driving the rear and intermediate rolls, a sleeve rotatably mounted on the roll shaft, a fifth gear fixed on the sleeve and meshing with the third gear, means for intermittently locking the sleeve to rotate with the roll shaft to cause the fifth gear to intermittently impart rotation to the third gear and the first pinion at a greater speed of rotation than the normal speed of rotation of the fourth gear for imparting a greater than normal rate of speed to the rear and intermediate rolls.

2. In a spinning frame having rear, intermediate and front rolls for drawing fibers, means for driving the rear and intermediate rolls and for intermittently increasing the speed of rotation of the rear and intermediate rolls comprising a drive shaft, a first gear fixed on the said drive shaft, a shaft extending from the front rolls, a second gear fixed on the end of the front roll shaft and meshing with the first gear, a first pinion fixed on the roll shaft, a stud shaft having a hub member rotatable thereon, a second pinion and a third gear fixed on the hub member, a fourth gear mounted on the hub member and meshing with the first pinion, an overriding clutch between the fourth gear and the hub member, a direct driving connection between the second pinion on the hub member and the rear and intermediate rolls for driving the rear and intermediate rolls, a sleeve rotatably mounted on the roll shaft, a fifth gear fixed on the sleeve and meshing with the third gear, means for intermittently locking the sleeve to rotate with the roll shaft to cause the fifth gear to intermittently impart rotation to the third gear and the first pinion at a greater speed of rotation than the normal speed of rotation of the fourth gear for imparting a greater than normal rate of speed to the rear and intermediate rolls, and pattern mechanism driven by the drive shaft for controlling the locking of the sleeve to rotate with the front roll shaft.

3. In a spinning frame having rear, intermediate and front rolls for drawing fibers, means for imparting a constant speed of rotation to the front rolls and means for intermittently increasing and decreasing the speed of rotation of the back and intermediate rolls comprising a drive shaft, a first gear mounted on the drive shaft, a shaft extending from the front rolls, a second gear mounted on the front roll shaft and meshing with the first gear, a first pinion fixed on the front roll shaft, a stud shaft having a hub member rotatably mounted thereon, a fourth gear rotatably mounted on the hub member and meshing with the first pinion, a second pinion and a third gear fixedly mounted on the said hub member, a direct driving connection between the second pinion and the rear and intermediate rolls for imparting rotation to the rear and intermediate rolls at a relatively slow rate of speed, a tubular shaft rotatably mounted on the front roll shaft, a fifth gear fixedly mounted on the tubular shaft and meshing with the third gear fixed on the hub member, means for intermittently rotating the tubular shaft at the same rate of speed as the front roll shaft, an overriding clutch between the fourth gear and its hub member and a pattern mechanism driven by the drive shaft for controlling the intermittent rotation of the tubular shaft whereby, upon the tubular shaft being rotated, the fifth gear fixed on the tubular shaft will impart rotation to the third gear on the hub member and its second pinion and whereby the overriding clutch will permit the hub member to rotate at a faster rate of speed than the fourth gear mounted thereon thus resulting in the speed of the rear and intermediate rolls being substantially increased.

4. In a structure according to claim 3, said pattern means comprising, in the making of slub yarns, a sixth gear fixed on the front roll shaft, said sixth gear having an annular portion defining a cavity, a ratchet wheel fixedly mounted on one end of the tubular shaft and being disposed within the said cavity, a dog mounted for radial sliding movement in the annular portion of the sixth gear and being adapted to intermittently engage the said ratchet wheel for transmitting rotation from the sixth gear on the front roll shaft to the tubular shaft, a driven pattern wheel mounted adjacent the annular portion of said sixth gear and having a plurality of unequally spaced projections thereon which are adapted to engage the outer end of the said dog for projecting the dog into engagement with the said ratchet wheel, a cam member adapted to be fixedly connected to the spinning frame for engaging the dog in the course of a revolution of the sixth gear to project the dog outwardly and thus out of engagement with the ratchet wheel, whereby the rear and intermediate rolls are driven at a greater than normal rate of speed and are intermittently driven at a normal rate of speed.

5. In a structure according to claim 3, said pattern means comprising, in the making of slub yarns, a sixth gear fixed on the front roll shaft, said sixth gear having an annular portion defining a cavity, a ratchet wheel fixedly mounted on one end of the tubular shaft and being disposed within the said cavity, a dog mounted for radial sliding movement in the annular portion of the sixth gear and being adapted to intermittently engage the said ratchet wheel for transmitting rotation from the sixth gear on the front roll shaft to the tubular shaft, a driven pattern wheel mounted adjacent the annular portion of said sixth gear and having a plurality of unequally spaced projections thereon which are adapted to engage the outer end of the said dog for projecting the dog into engagement with the said ratchet wheel, a cam wheel rotatably mounted on the tubular shaft and having a lobe portion on its periphery which is adapted to engage the said dog as it rotates with the sixth gear, means on the spinning frame for locking the said cam wheel against rotation to thus render the lobe on the said cam wheel effective to project the dog outwardly and thus out of engagement with the ratchet wheel, whereby the rear and intermediate rolls are driven at a greater than normal rate of speed and are intermittently driven at a normal rate of speed.

6. A Himalaya attachment for spinning frames and the like, said spinning frames having rear rolls, intermediate rolls and front rolls which are driven in increasing differential speeds from the rear to the front rolls, a shaft extending from the front rolls, means for intermittently increasing the speed of rotation of the rear and intermediate rolls comprising a drive shaft, a first gear mounted on said drive shaft, a second gear mounted on the end of the roll shaft and meshing with the first gear, a stub shaft having a hub member rotatably mounted thereon, a fourth gear rotatably mounted on the hub member, an overriding clutch between the fourth gear and the hub member, a first pinion fixed on the roll shaft and meshing with the fourth gear for imparting rotation thereto and to its associated hub, a third gear and a second pinion fixedly mounted on the said hub member, a direct driving connection between the second pinion and the rear and intermediate rolls, a tubular shaft rotatably mounted on the front roll shaft, a fifth gear fixedly mounted on the tubular shaft and meshing with the third gear, the said tubular shaft being adapted to rotate freely during a normal rate of speed of rotation being transmitted to the rear and intermediate rolls, a sixth gear fixed on the front roll shaft, a ratchet wheel fixed on the tubular shaft in close proximity to the sixth gear, and a radially movable dog mounted on the sixth gear and being adapted to intermittently engage the ratchet wheel on the tubular shaft for imparting rotation from the front roll shaft to the tubular shaft whereby the overriding clutch will permit the hub member to rotate at a faster rate of speed than its associated fourth gear thus resulting in a greater rate of speed being imparted to the rear and intermediate rolls.

7. A Himalaya attachment for spinning frames and the like, said spinning frames having rear rolls, intermediate rolls and front rolls which are driven in increasing differential speeds from the rear to the front rolls, a shaft extending from the front rolls, means for intermittently increasing the speed of rotation of the rear and intermediate rolls comprising a drive shaft, a first gear mounted on said drive shaft, a second gear mounted on the end of the roll shaft and meshing with the first gear, a stub shaft having a hub member rotatably mounted thereon, a fourth gear rotatably mounted on the hub member, an overriding clutch between the fourth gear and the hub member, a first pinion fixed on the roll shaft and meshing with the fourth gear for imparting rotation thereto and to its associated hub, a third gear and a second pinion fixedly mounted on the said hub member, a direct driving connection between the second pinion and the rear and intermediate rolls, a tubular shaft rotatably mounted on the front roll shaft, a fifth gear fixedly mounted on the tubular shaft being adapted to rotate freely during a normal rate of speed of rotation being transmitted to the rear and intermediate rolls, a sixth gear fixed on the front roll shaft, a ratchet wheel fixed on the tubular shaft in close proximity to the sixth gear, and a radially movable dog mounted on the sixth gear and being adapted to intermittently engage the ratchet wheel on the tubular shaft for imparting rotation from the front roll shaft to the tubular shaft whereby the overriding clutch will permit the hub member to rotate at a faster rate of speed than its associated fourth gear thus resulting in a greater rate of speed being imparted to the rear and intermediate rolls, a cam wheel rotatably mounted on the tubular shaft and having a raised portion on its periphery, a pin projecting from the said dog and being engageable by the raised portion of the cam when the dog is in engagement with the ratchet wheel, said ratchet wheel also having a notch in its periphery, a Himalaya pattern chain driven by the said drive shaft, an oscillatable finger adapted to normally engage the notch in the cam wheel for holding the cam wheel in a fixed position to thus cause the lobe of the cam wheel to be engaged by the pin on the dog to project the dog out of engagement with the ratchet wheel for imparting normal rotation to the rear and intermediate rolls, pattern means in the said pattern chain, a roller on the said oscillatable finger and engaging the pattern chain whereby, upon the pattern means engaging the roller on the oscillatable finger, the said finger will be moved out of engagement with the notch in the cam wheel while the roller will be moved into alinement with the rotational path of the dog to thus project the dog inwardly to engage the ratchet wheel for imparting a greater than normal rate of speed to the rear and intermediate rolls and means for moving the oscillatable finger into the notch in the periphery of the cam wheel after the cam wheel has passed by the oscillatable finger for again stopping the cam wheel and to again project the dog out of engagement with the ratchet wheel.

8. In a spinning frame having front, intermediate and rear rolls, means for driving all of the rolls at gradually increasing speeds from rear to front respectively, Himalaya means for intermittently increasing the speed of rotation of the rear and intermediate rolls, a slub attachment for also intermittently imparting increased speeds of rotation to the rear and intermediate rolls, pattern control means for activating the Himalaya means for increasing the speed of rotation of the rear and intermediate rolls and said pattern control means also having means for activating the slub attachment means for increasing the speed of rotation of the rear and intermediate rolls after a predetermined interval has elapsed from the time said rear and intermediate rolls have resumed their normal speed of rotation after having been activated by the Himalaya means.

9. In a spinning frame having rear, intermediate and front rolls, means for driving all of the rolls at normal gradually increasing speeds from rear to front respectively, a slub attachment having slub pattern control means for intermittently imparting a faster than normal rate of rotation to the rear and intermediate rolls for varying intervals of restricted duration, Himalaya pattern control means cooperating with the said slub attachment for selectively rendering the slub pattern control means inoperative and simultaneously imparting rotation to the rear and intermediate rolls at a faster than normal rate of speed for intermittent periods of longer duration than the maximum duration of the periods possible with the slub pattern control means.

10. In a spinning frame having rear, intermediate and front rolls, means for driving all of the rolls at normal gradually increasing speeds from rear to front respectively, a slub attachment having slub pattern control means for imparting a faster than normal rate of rotation to the rear and intermediate rolls for varying intervals of restricted duration, Himalaya pattern control means cooperating with the said slub attachment for selectively rendering the slub pattern control means inoperative and simultaneously imparting rotation to the rear and intermediate rolls at a faster than normal rate of speed for intermittent periods.

11. In a spinning frame having front, intermediate and rear driving rolls thereon and means for imparting normal rotation to the rear, intermediate and front rolls at progressively increasing rates of speed, a slub attachment, pattern means for controlling said slub attachment, said slub attachment being adapted to intermittently impart a faster rate of rotation than normal to the rear and intermediate rolls simultaneously, a Himalaya attachment, a connection between the Himalaya attachment and the slub attachment, means on the Himalaya attachment for rendering the pattern means for the slub attachment inoperable and for simultaneously increasing the pattern range of the slub attachment to thus impart a faster than normal rate of rotation to the rear and intermediate rolls for intermittent periods of increased duration relative to the periods of duration possible with the slub pattern means.

12. In a spinning frame having front, intermediate and rear drawing rolls thereon and means for imparting normal rotation to the rear, intermediate and front rolls at progressively increasing rates of speed, a slub attachment, pattern means for controlling said slub attachment, said slub attachment being adapted to intermittently impart a faster rate of rotation than normal to the rear and intermediate rolls simultaneously, a Himalaya attachment, a connection between the Himalaya attachment and the slub attachment, means on the Himalaya attachment for rendering the pattern means for the slub attachment inoperable and for simultaneously increasing the pattern range of the slub attachment to thus impart a faster than normal rate of rotation to the rear and intermediate rolls for intermittent periods.

13. In a spinning frame having rear, intermediate and front rolls and having means for imparting normal rotation at increasing rates of speed from rear to front rolls, successively, a slub attachment carried by the spinning frame, slub pattern control means, Himalaya pattern control means, a mechanical connection between the slub pattern control means and the slub attachment and another mechanical connection between the Himalaya pattern control means and the slub attachment, and means for selectively rendering the slub attachment responsive to the Himalaya pattern means and for intermittently rendering the slub attachment responsive to the slub pattern means.

14. In a spinning frame having rear, intermediate and front rolls and normal driving means for imparting rotation to the rear, intermediate and front rolls at progressively increasing rates of speed from rear to front, slub pattern means, Himalaya pattern means, overriding clutch means associated with the normal driving means for transmitting rotation to the rear and intermediate rolls at a normal rate of speed, means on the slub pattern means for intermittently engaging the overriding clutch means for transmitting rotation to the rear and intermediate rolls at a faster than normal rate of speed at varying intervals of restricted duration, and means on the Himalaya pattern means for engaging the clutch means for also imparting a faster rate of speed of rotation to the rear and intermediate rolls for varying periods of longer duration than the periods of duration at which faster than normal rates of speed are imparted to the rear and intermediate rolls by the slub pattern means, said Himalaya pattern means being adapted to render the slub pattern means ineffective during engagement of the means on the Himalaya pattern means with the overriding clutch means.

15. In a spinning frame having front, intermediate and rear top and bottom rolls, driving means connected to the bottom rolls for imparting rotation simultaneously to all of the rolls, the rate of rotation of the rolls progressively increasing from rear to front, an overriding clutch disposed in said driving means, a first and a second pattern means, a driving connection between the overriding clutch and the intermediate and rear bottom rolls, pattern controlled means controlled by the first pattern means for intermittently driving the overriding clutch at a greater rate of speed than its normal rate of rotation to thereby impart an increased rate of rotation to the intermediate and rear rolls, said first pattern means being ineffective at varying intervals and said pattern controlled means also being controlled by the second pattern means for driving the overriding clutch intermittently at a faster than normal rate of speed and at times when the first pattern means is ineffective.

16. In a spinning frame having front, intermediate and rear bottom rolls, a first driving means for imparting a normal rate of rotation to the front, intermediate and rear bottom rolls with the revolutions per minute of the rolls increasing from the rear roll to the front roll, respectively, a second driving means, an overriding clutch disposed on the first driving means and having a driving connection with the intermediate and the rear rolls, a first pattern means, pattern controlled means controlled by the first pattern means for causing the second driving means to be rendered active to drive the overriding clutch and the intermediate and rear rolls at a faster than normal rate of speed while the front roll is being driven at its normal rate of speed, the first pattern means serving to intermittently impart increased rotation to the intermediate and rear rolls, said first pattern means being ineffective at varying intervals and a second pattern means also controlling the second driving means for the said overriding clutch while the first pattern means is ineffective to intermittently advance the speed of rotation of the intermediate and rear rolls at periods which are disposed between the periods said intermediate and rear rolls have been driven at a faster than normal rate of speed.

IRMA B. McKEOWN.

No references cited.

Certificate of Correction

Patent No. 2,509,443 May 30, 1950

IRMA B. McKEOWN

It is hereby certified that error appears in the printed specification of the above numbered patent requiring correction as follows:

Column 13, line 41, for the word "driving" read *drawing*;

and that the said Letters Patent should be read as corrected above, so that the same may conform to the record of the case in the Patent Office.

Signed and sealed this 10th day of October, A. D. 1950.

[SEAL]

THOMAS F. MURPHY,
*Assistant Commissioner of Patents.*